United States Patent Office 2,742,466
Patented Apr. 17, 1956

2,742,466

CHLOROMETHYL DERIVATIVES OF SUBSTITUTED TRIAZINES

David I. Randall and Edgar E. Renfrew, Easton, Pa., assignors to General Aniline & Film Corporation, New York, N. Y., a corporation of Delaware No Drawing. Application February 12, 1953, Serial No. 336,637

6 Claims. (Cl. 260—249.5)

This invention relates to a new class of chloromethyl derivatives of substituted triazines useful as intermediates for the preparation of numerous products of potential commercial value.

The chloromethylation of dianthrone by the reaction of dichloromethyl ether in sulfuric acid and the chloromethylation of certain classes of aromatic compounds is well known and described in the chemical literature. According to Fuson and McKeever in Organic Reactions, vol. 1, page 66, 1942, aromatic amines react readily under chloromethylating conditions, but it is usually not possible to isolate their simple chloromethyl derivatives (Journal of American Chemical Society, 55, 724 [1933]). The simple products "could hardly be expected to be stable since the highly reactive chloromethyl group would undoubtedly condense with any amino group that might be present in the molecule."

Even though the amino groups of symmetrically substituted melamines differ in reactivity from classical amino groups of arylamino, it is surprising that substituted triazines can be chloromethylated to yield derivatives useful as intermediates for the preparation of a variety of useful chemicals, particularly as valuable intermediates for dyestuffs as will be described hereinafter. The chloromethyl derivatives of substituted triazines in accordance with the present invention are characterized by the following general formula:

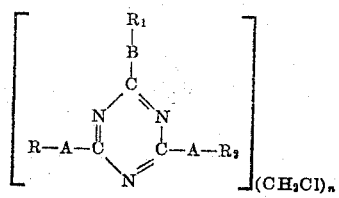

wherein A represents either oxygen, sulfur, or an —NH— group, B represents either oxygen, sulfur, an —NH— or —N—CH₃ group, R and R₁ represent an alkyl group containing from 1 to 10 carbon atoms, such as methyl, ethyl, propyl, isopropyl, butyl, secondary butyl, isobutyl, tertiary butyl, amyl, isoamyl, tertiary amyl, hexyl, isohexyl, heptyl, octyl, nonyl, decyl, and the like, aryl, such as phenyl, o-, m-, and p-tolyl, cumyl, xylyl, o-cymyl, 2-, 3-, and 4-biphenyl, stilbene 1- and 2-anthraquinolyl, the various isomers of phenanthryl, such as 1-phenanthryl and the like, cycloalkyl, e. g., cyclopropyl, cycloheptyl, cyclopentyl, cyclohexyl, and the like, R₂ represents an aryl group selected from the class consisting of phenyl, o-, m-, and p-tolyl, cymyl, xylyl, o-, cymyl, 2-, 3-, and 4-biphenyl and stilbene, and $n$ represents a numeral from 1 to 6. It is to be understood that when R and R₁ are alkyl, anthraquinonyl and other polycyclic anthraquinonyl groups which are not appreciably susceptible to chloromethylation, the value of $n$ is small, e. g., 1 or 2, dependent upon the number of chloromethyl groups entering the R₂ moiety. If R and R₁ are aryl groups susceptible to chloromethylation, it is obvious that $n$ may be varied from 1 to 5 or 6 by appropriate choice of R, R₁, and R₂ and the use of excess bis-chloromethyl ether under suitable reaction conditions.

For purposes of a clearer understanding of the present invention, it is to be noted that the substituted phenyl radicals designated by R, R₁ and R₂ must be limited in the number of directing type groups, such as, for example, sulfo, carboxyl, or nitro groups on the aryl fragment, the presence of more than one of which per substituted aryl radical would make substitution difficult, or the presence of another primary amino group or oxygen linked group, such as hydroxy or alkoxy on the aryl fragment which would make the radical so sensitive that a chloromethyl group could not coexist with it but would interact. Outside of these specific groups, other groups may be present which do not affect the progress of the reaction, such groups being halogen, alkyl, and only one nitro group as pointed out above. In addition, the only amino group in the substituted aryl must be the one serving as the connecting link to the triazine nucleus, or if the aryl group be linked through oxygen to the triazine nucleus, no other amino or oxygen linked group may be present on the substituted aryl.

The process involved in preparing the compounds characterized by the foregoing formula consists of treating a 2,4,6-substituted symmetrical triazine in sulfuric acid of 96-100%, preferably of 99-100%, strength with an amount of bis-chloromethyl ether sufficient to provide the desired number of entering chloromethyl groups at a temperature ranging from 5 to 35° C. for a period of time ranging from 30 minutes to 1½ hours.

The 2,4,6-trisubstituted symmetrical triazines utilized in accordance with the present invention are prepared in the conventional manner by treating cyanuric chloride with suitable reagents according to the well known methods in which the substituents can be introduced individually and stepwise if desired. As amines which are suitable for this type of condensation reaction, the following are given as examples: primary and secondary alkylamines, such as methylamine, dimethylamine, ethylamine, isopropylamine, normal and secondary butylamine and substituted amines, such as benzylamine, glycine, etc.

Typical arylamines which are suitable are as follows:

Sulfanilic acid
Aniline
o-Toluidine
m-Toluidine
p-Toluidine
4-aminostilbene disulfonic acid
4,4'-diaminostilbene disulfonic acid
4-(p-nitrobenzeneazo)aniline
Cumidine
2,4-dimethylaniline
1-aminoanthraquinone
2-aminoanthraquinone
1-amino-2-methylanthraquinone
1-amino-4-benzoylamidoanthraquinone
1-amino-5-benzoylamidoanthraquinone The cyclic alkylamines which may be utilized are cyclohexylamine and morpholine.

Under the conditions of the chloromethylation reaction involved in preparing the compounds of the present invention, hydrolysis to cyanuric acid (2,4,6-trihydroxy-s-triazine) is not an important side reaction. In certain cases, the compounds were carried through the reaction condition omitting only the chloromethylating agent, i. e., bis-chloromethyl ether, whereby the starting materials were recovered unchanged.

The following examples will describe in detail the chloromethylation of the 2,4,6-substituted triazine with a brief mention of the coreactants involved in the preparation of the latter. All the parts given are by weight unless otherwise noted. These examples are given for purposes of illustration and are not to be construed as being limitative of the compounds described and disclosed.

*Example 1*

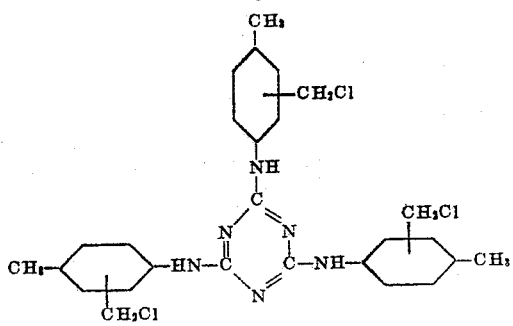

To a stirred solution of 3700 parts of sulfuric acid (99.6%) and 255 parts of bis-chloromethyl ether, there were added over 1 hour 157 parts of 2,4,6-p-toluino-s-triazine (prepared by treating cyanuric chloride with excess p-toluidine in meta-para cresol for 4 hours at 200° C.). The mixture was allowed to stand at 25–35° C. for 16 hours, after which time it was poured into water containing ice. The solid which separated was isolated by filtration, washed neutral with water and dried. It weighed 234 parts. A structure bearing three chloromethyl groups has the formula $C_{27}H_{27}N_6Cl_3$.

|  | Percent |
|---|---|
| Cl calc | 19.5 |
| Cl found | 18.6 |

*Example 2*

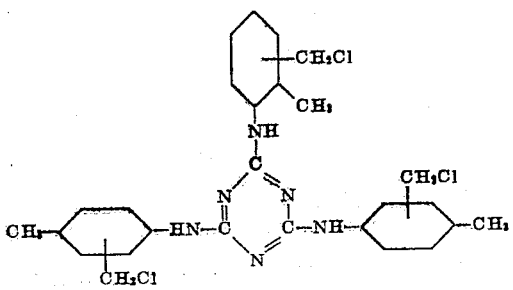

The tris-chloromethyl derivative of 2,4,6-o-toluino-s-triazine was made by the method described in Example 1 except that 2,4,6-o-toluino-s-triazine was used instead of 2,4,6-p-toluino-s-triazine. The dried product weighed 232 parts. It contained 16% chlorine.

*Example 3*

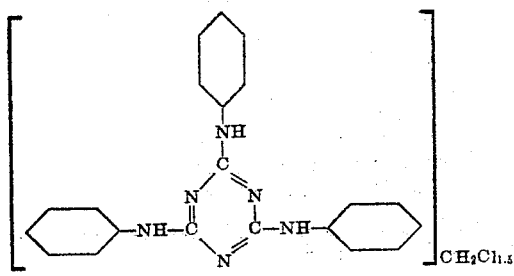

To a stirred solution made from 2568 parts of sulfuric acid (99.6%) and 169 parts of bis-chloromethyl ether at 5–10° C., there were added over a period of 10 minutes 167 parts of 2,4,6-trianilino-s-triazine (prepared by heating aniline and cyanuric chloride in meta-para cresol). Stirring was continued at 5–10° C. for 40 minutes more, after which time the mixture was drowned in water containing ice. The product which separated was collected by filtration and washed on the filter with water until the washings ran neutral. The product after drying at 45–50° C. under vacuum weighed 200 parts. It showed 12.3% chlorine on analysis. An equimolar mixture of bis-chloromethylated product ($C_{23}H_{17}N_6Cl_2$) and a monochloromethylated product ($C_{22}H_{16}N_6Cl$) has a calculated chlorine content of 12.6%.

*Example 4*

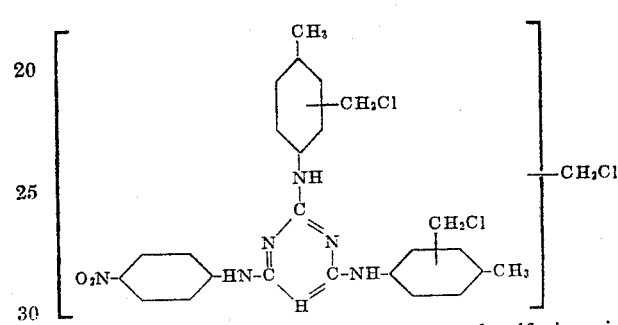

To a stirred solution of 3700 parts of sulfuric acid (99.6%) and 210 parts of bis-chloromethyl ether at 35–30° C., there were added over a period of 45 minutes in portions 170 parts of 2,4-di-p-toluino-6-p-nitroanilino-s-triazine. The temperature of the mixture was maintained at 30–35° C. for 15 hours, after which time the mixture was poured into water containing ice. The product which separated was isolated by filtration, washed free from acid with water, and dried in vacuo at 60° C. It weighed 243 parts. A compound bearing three chloromethyl groups has the formula $C_{26}H_{24}O_2N_7Cl_3$.

|  | Percent |
|---|---|
| Cl calc | 18.6 |
| Cl found | 16.1 |

*Example 5*

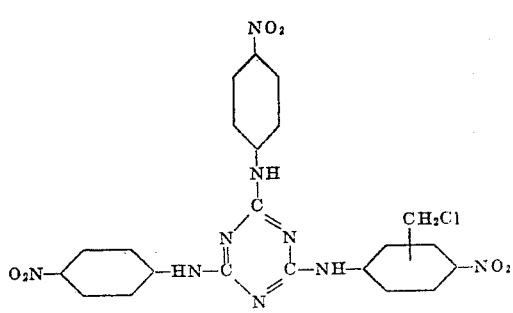

To a stirred solution made of 3680 parts of sulfuric acid (99.6%) and 310 parts of bis-chloromethyl ether, there were added at room temperature over 5 minutes 244 parts of 2,4,6-tris-(p-nitroanilino)-s-triazine (prepared from p-nitroaniline and cyanuric chloride by heating in meta-para cresol). The temperature was raised to 45° C. and held for 4 hours, the mixture being stirred during this period. The mixture was then poured into water containing ice. The material which separated was isolated by filtration and washed on the filter until free from acid. After drying under vacuum at 50° C., the cake weighed 292 parts. A product bearing one chloromethyl group has the formula $C_{22}H_{16}O_6N_9Cl$.

|  | Percent |
|---|---|
| Cl calc | 6.6 |
| Cl found | 4.6 |

Example 6

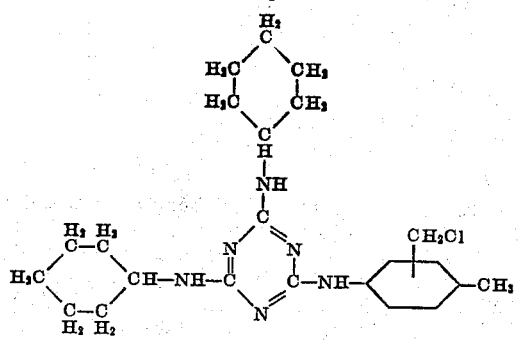

To a stirred solution made from 555 parts of sulfuric acid (99.6%) and 23 parts of bis-chloromethyl ether, there were added in portions over ½ hour 38 parts of 2,4-dicyclohexylamino-6-p-toluino-s-triazine. The mixture was stirred at 20° C. for 3 hours. It was then poured into water containing ice. The material which separated was isolated by filtration and washed free from acid with water. After drying under vacuum at 60° C. the cake weighed 42 parts. A compound bearing one chloromethyl group has the formula $C_{23}H_{33}N_6Cl$.

|  | Percent |
|---|---|
| Cl calc | 8.3 |
| Cl found | 7.9 |

Example 7

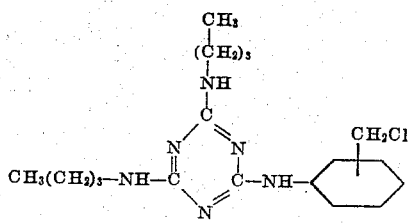

To a stirred solution made from 555 parts of sulfuric acid (99%) and 29 parts of bis-chloromethyl ether at 5–10° C., there were added 31 parts of 2,4-di-n-butyl-amino-6-anilino-s-triazine (prepared from cyanuric chloride by the stepwise addition of n-butylamine and aniline under suitable conditions). Stirring was continued for 2 hours. The temperature was held below 10° C. The mixture was poured into water containing ice and the material which separated was collected and washed acid-free with water. After drying under reduced pressure at 60° C., it weighed 36 parts. A compound bearing one chloromethyl group has the formula $C_{18}H_{27}N_6Cl$.

|  | Percent |
|---|---|
| Cl calc | 9.8 |
| Cl found | 9.0 |

Example 8

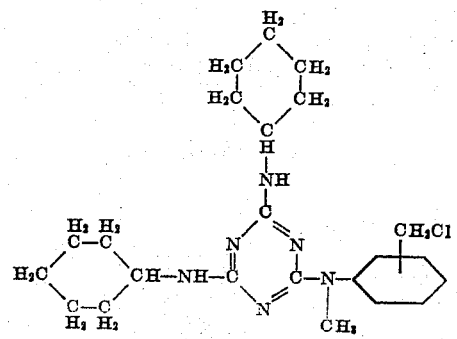

Example 7 was repeated with the exception that 38 parts of 2,4-di-(cyclohexylamino)-6-N-methylanilino-s-triazine were used instead of the 2,4-di-n-butylamino-6-anilino-s-triazine. The material weighed 43 parts.

Example 9

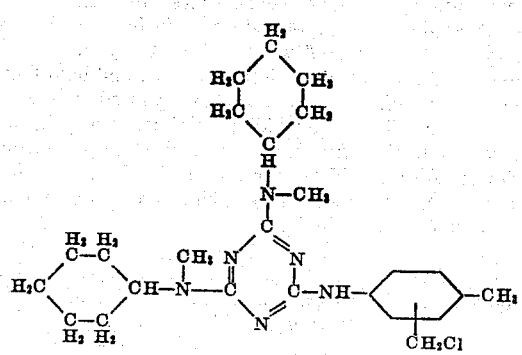

Example 7 was repeated with the exception that 41 parts of 2,4-bis(N-methylcyclohexylamino)-6-p-toluino-s-triazine were used instead of the 2,4-di-n-butylamino-6-anilino-s-triazine, and the operating conditions were 4 hours at 25° C. instead of 2 hours at 5–10° C. The product weighed 44 parts.

Example 10

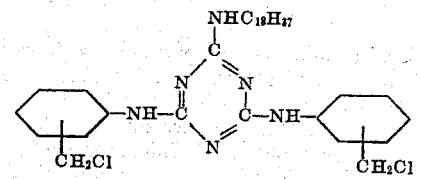

To a stirred solution made from 923 parts of sulfuric acid (99.3%) and 61 parts of bis-chloromethyl ether maintained at 5–10° C., there were added over a short time 60 parts of 2,4-dianilino-6-stearylamino-s-triazine (made from cyanuric chloride in meta-para cresol by adding a molar amount of stearylamine and heating to 100° C. for 2 hours, then adding more than double molar amount of aniline and heating at 180° C. for 2 more hours). The mixture was stirred at 5–10° C. for 40 minutes, after which time it was poured into water containing ice. The material which separated was collected on a filter, washed free from acid with water, and dried under a vacuum at 60° C. The weight of the dry product was 65 parts. A product bearing two chloromethyl groups has the formula $C_{35}H_{52}N_6Cl_2$.

|  | Percent |
|---|---|
| Cl calc | 11.3 |
| Cl found | 10.9 |
| N calc | 13.8 |
| N found | 15.2 |

Example 11

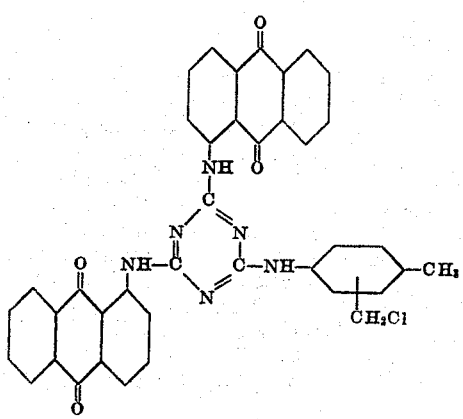

To a solution made up of 1850 parts of sulfuric acid (99.6%) and 58 parts of bis-chloromethyl ether, there were added over 15 minutes, 113 parts of 2,4-di-α-anthraquinonyl-6-p-toluino-s-triazine (prepared by treating 2,4-di-α-anthraquinonyl-amino-6-chloro-s-triazine with p-toluidine). The mixture was stirred briefly at 28° C. The temperature was then raised to 60° C. and held there 3 hours. The mixture was cooled and poured into water containing ice. The solid which precipitated was collected by filtration, washed free from acid with water, and dried at 60° C. under reduced pressure. The dried cake weighed 129 parts. A product bearing one chloromethyl group has the formula $C_{39}H_{25}O_4N_6Cl$.

|  | Percent |
|---|---|
| Cl calc | 5.3 |
| Cl found | 5.8 |

Example 12

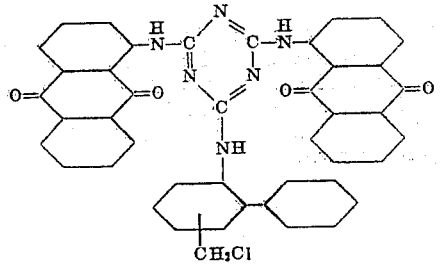

To a stirred solution of 133 parts of bis-chloromethyl ether in 1840 parts of sulfuric acid (98%), there were added at 5° C. 70 parts of 2,4-di(1'-anthraquinonylamino)-6-(2''-biphenylamino)-s-triazine (which was prepared by adding 2 moles of 1-aminoanthraquinone per mole of cyanuric chloride in meta-para cresol, heating at a temperature suitable to cause complete reaction in a reasonable time, and adding excess 2-biphenylamine and raising the temperature). The reaction mixture was stirred at 5°–10° C. for 1½ hours after which time it was poured into water containing ice. The product which separated was collected by filtration and washed on the filter until the washings were no longer acidic. The cake was dried under vacuum at 55° C. It weighed 55 parts. A product bearing one chloromethyl group has the formula $C_{44}H_{27}O_4N_6Cl$.

|  | Percent |
|---|---|
| Cl calc | 4.8 |
| Cl found | 5.8 |

Example 13

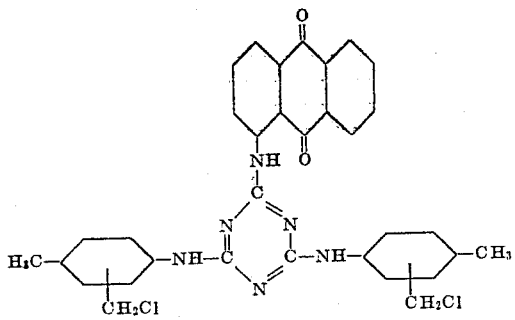

To a solution made from 1850 parts of sulfuric acid (99.6%) and 183 parts of bis-chloromethyl ether, there were added over 1 hour 102 parts of 2,4-di-p-toluino-6-α-anthraquinonylamino-s-triazine (prepared from 2,4-dichloro-6-α-anthraquinonylamino-s-triazine). The mixture was stirred at 50° C. for 4 hours, after which time it was cooled and poured into water containing ice. The product which separated was collected on a filter, washed with water until the washings were neutral to litmus, and dried under vacuum at 60° C. The cake weighed 118 parts. A compound bearing two chloromethyl groups has the formula $C_{33}H_{26}O_2N_6Cl_2$.

|  | Percent |
|---|---|
| Cl calc | 11.7 |
| Cl found | 12.6 |

Example 14

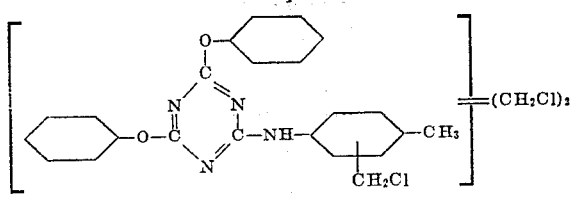

To a stirred solution made from 5550 parts of sulfuric acid (99.6%) and 460 parts of bis-chloromethyl ether, there were added slowly 370 parts of 2,4-diphenoxy-6-p-toluino-s-triazine (which was made by dissolving equimolar amounts of cyanuric chloride and p-toluidine in phenol as the solvent, heating at 100° C. for 1 hour, followed by 4 hours at 180° C.). The temperature was maintained at 25° C. for 4 hours, after which time the mixture was poured into water containing ice. The solid which separated was collected on a filter, washed free of acid with water, and dried under vacuum in an oven at 50° C. It weighed 505 parts. A compound bearing three chloromethyl groups has the formula $C_{25}H_{21}O_2N_4Cl_3$.

Example 15

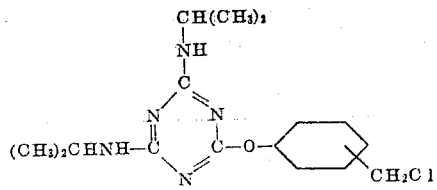

To a stirred solution made from 555 parts of sulfuric acid (99%) and 29 parts of bis-chloromethyl ether, there were added over ½ hour 40 parts of 2,4-di-isopropylamino-6-phenoxy-s-triazine (prepared by warming di-isopropylamine and cyanuric chloride, molar ratio 2:1, in phenol, followed by heating to the boiling point of phenol). The mixture was stirred 4 hours at 26° C. after which time it was poured into water containing ice. The solid which precipitated was isolated by filtration and washed free from acid with water. The cake after drying at 50° C. under reduced pressure weighed 42 parts. A product bearing one chloromethyl group has the formula $C_{24}H_{34}ON_5Cl$.

Example 16

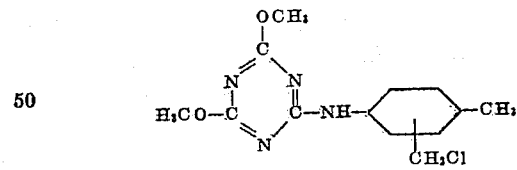

To a solution made from 5550 parts of sulfuric acid (99.6%) and 230 parts of bis-chloromethyl ether, there were added 246 parts of 2,4-dimethoxy-6-p-toluino-s-triazine. The mixture was stirred 4 hours at 35° C., after which time it was drowned in water containing ice. The product which separated was isolated by filtration, washed free from acid with water and dried under vacuum at 60° C. It weighed 285 parts. A compound bearing one chloromethyl group resulted.

Example 17

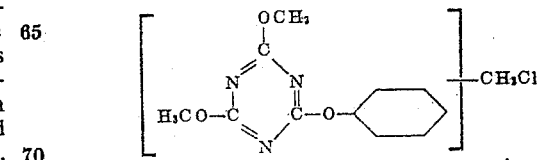

Example 16 was repeated with the exception that 233 parts of 2,4-dimethoxy-6-phenoxy-triazine were used instead of 2,4-dimethoxy-6-p-toluino-s-triazine. The product weighed 280 parts. A material bearing one chloromethyl group resulted.

Example 18

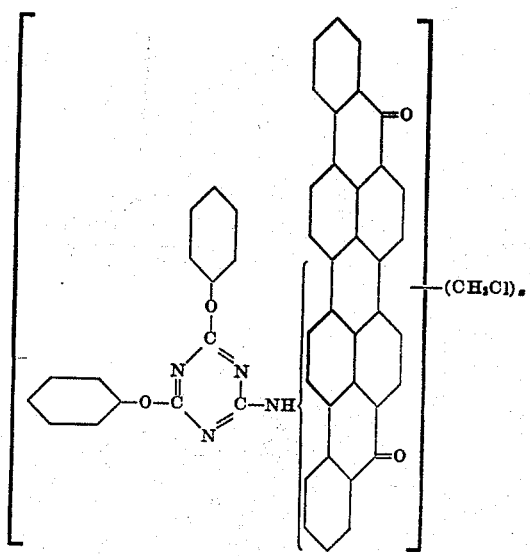

To a solution made from 2760 parts of sulfuric acid (99.6%) and 173 parts of bis-chloromethyl ether at 25–30° C. over ¼ hour, there were added 151 parts of 2,4 - diphenoxy - 6-x-violanthronylamino-s-triazine (which was made by mononitrating violanthrone and reducing the product, treating this amine in meta-para cesol with an equimolar portion of cyanuric chloride and excess phenol at the boiling point of the mixture for 4 hours). The mixture was stirred for 1 hour at 25–30° C., after which time there were added 79 parts more of bis-chloromethyl ether. The mixture after stirring for 10 hours was allowed to stand 48 hours more at 25–30° C. It was then poured into ice and water. The product which settled was collected by filtration and washed neutral on the filter with water. The cake after drying under vacuum at 60° C. weighed 215 parts.

Example 19

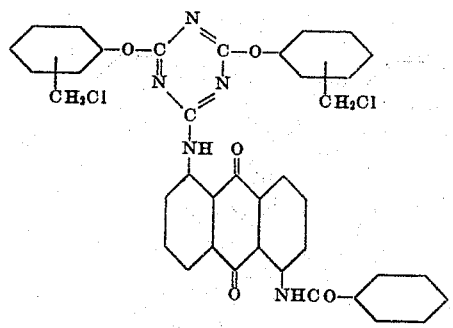

To a stirred solution of 5550 parts of sulfuric acid (99.6%) and 173 parts of bis-chloromethyl ether, there were added over 10 minutes at 25–30° C. 151 parts of 2,4 - diphenoxy - 6 - (5' - benzamido-1-anthraquinonylamino)-s-triazine (which was prepared by stirring equimolar portions of cyanuric chloride and 1-amino-5-benzamidoanthraquinone in phenol). The temperature was maintained at 110° C. for 1½ hours, after which time it was raised to 180° C. for 2 hours. The product was isolated by diluting the cooled mass with methanol and filtering off the material which separated. The mixture was stirred for 1 hour, after which time, there were added 80 parts more of bis-chloromethyl ether. Stirring was continued 3½ hours more, after which time the mixture was poured into water containing ice. The material which precipitated was collected on a suction filter and washed free from acid with water. It weighed 177 parts after drying at 55° C. under vacuum. A compound bearing two chloromethyl groups has the formula $C_{38}H_{27}O_5N_5Cl_2$.

|  | Percent |
|---|---|
| Cl calc | 10.1 |
| Cl found | 8.9 |

The product on warming with either pyridine or trimethylthiourea gives a water soluble quaternary compound which dyes cotton bright reddish brown shades from an aqueous bath.

Example 20

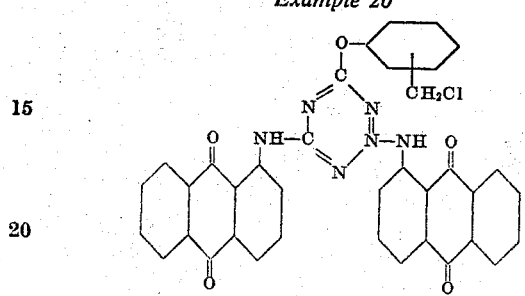

To 1850 parts of sulfuric acid (99.6%) over 15 minutes, there were added 123 parts of 2,4-bis(1'-anthraquinonylamino)-6-phenoxy-s-triazine (prepared from 2,4-bis - (1'- anthraquinonylamino) - 6 - chloro-s-triazine and phenol). There were then added 58 parts of bis-chloromethyl ether. The mixture was stirred at room temperature for 8 hours. It was poured into water containing ice and the material which separated was isolated by filtration, washed free from acid with water, and dried at 60° C. under vacuum. It weighed 130 parts. A product bearing one chloromethyl group has the formula $C_{38}H_{22}O_5N_5Cl$.

|  | Percent |
|---|---|
| Cl calc | 5.4 |
| Cl found | 5.2 |

Example 21

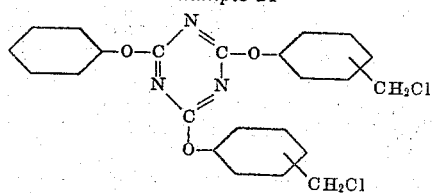

To a stirred solution made up of 2226 parts of sulfuric acid (96.4%) and 214 parts of bis-chloromethyl ether, there were added at 3° C. in portions 140 parts of 2,4,6-triphenoxy-s-triazine (which was prepared by refluxing cyanuric chloride in phenol for 3 hours, water added to the cooled mixture, and the excess phenol removed by steam distillation). Five minutes after the final addition, the cooling bath was removed. During an hour the temperature rose gradually to 28° C. Then there were added 117 more parts of bis-chloromethyl ether. Stirring was continued for 2½ hours, the temperature being 28° C. throughout. The reaction mixture was poured into water containing ice. The material which precipitated was collected on a filter, washed free from acid with water and dried at 60° C. under vacuum. The dried product weighed 218 parts. A product which bears two chloromethyl groups has the formula $C_{23}H_{17}O_3N_3Cl_2$.

|  | Percent |
|---|---|
| Cl calc | 15.6 |
| Cl found | 13.4 |

Example 22

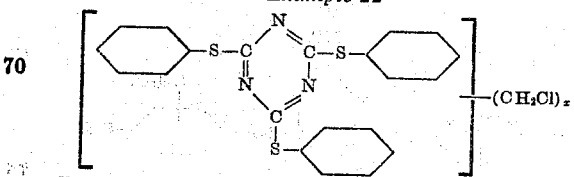

To a stirred solution made up of 185 parts of sulfuric acid (96.4%) and 16 parts of bis-chloromethyl ether, there were added in portions below 5° C. over ¼ hour 14 parts of 2,4,6-phenylmercapto-s-triazine (which was prepared by heating excess thiophenol and cyanuric chloride in dichlorobenzene in the presence of sodium acetate). The cooling bath was removed after the addition and the mixture allowed to warm spontaneously to room temperature. Then there were added 10 parts more of bis-chloromethyl ether. Stirring was continued for 2 hours, after which the mixture was poured into water containing ice. The material which settled out was collected on a filter and washed free from acid with water. When dried at 60° C. under reduced pressure, the product weighed 22 parts. A portion heated with trimethylthiourea gave a product which was freely water soluble.

From the foregoing examples, it will be noted that some of the chloromethyl derivatives of substituted triazines are colored and that some are uncolored. In the colored compounds, the color is due to the presence of a chromophoric group in the various substituents designated by R, $R_1$, and $R_2$ in the foregoing general formula. The radicals containing such chromophoric groupings are usually of the aryl type including anthraquinonyl and other polycyclic quinonyls. The colored chloromethyl compounds are valuable intermediates for the preparation of dyestuffs.

The colored chloromethyl compounds can be quaternized to yield water soluble materials for printing cotton and rayon and for dyeing of paper pulp. They can also enter into reactions with phenols, such as resorcinol, to yield dyestuffs having an increased measure of alcohol solubility while showing virtually no solubility in petroleum ether. Moreover, they can react with sodium thiosulfate to give dithionic acids (Bunte salts) which are water soluble materials suitable for dyeing wool.

In those examples where the chloromethyl compounds are indicated as not being colored, they are also useful as intermediates, especially as substituted benzyl chlorides. Thus, they can be used to substitute into a colored structure causing it to have better properties as a dyestuff or they can be used to synthesize complex benzyl structures useful in pharmaceutical chemistry, for instance, in the preparation of biocides of the quaternary type. A typical example is the reaction product of Example 3 and triethylamine.

In cases where the chloromethylated triazine is colored, especially the product in which the triazine is substituted with an anthraquinonylamino group, water soluble quaternaries with tertiary amines or thioureas can be prepared and the product utilized as cotton and paper printing colors.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:

1. Chloromethyl derivatives of 2,4,6-substituted triazines characterized by a formula selected from the class consisting of the following formulae:

(a)

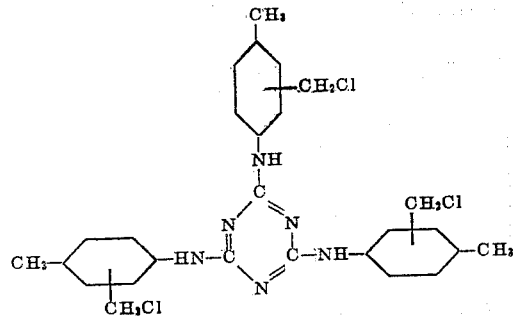

(b)

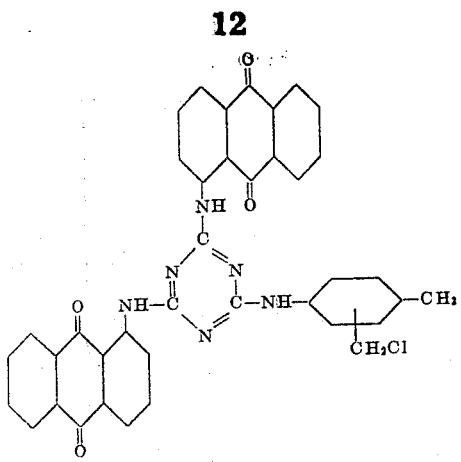

(c)

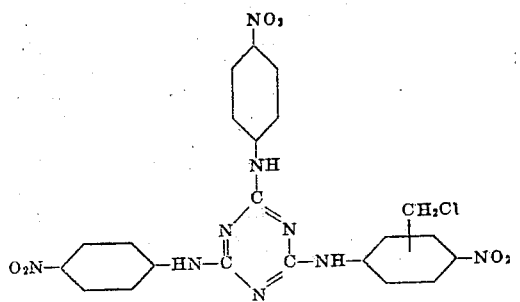

(d)

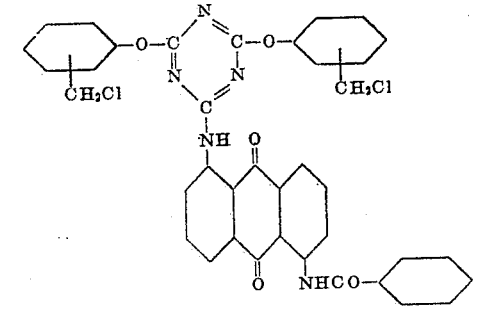

and (e)

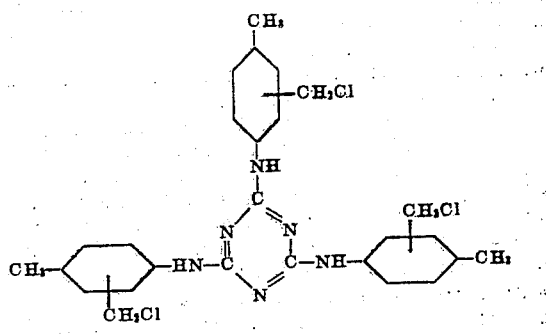

2. A chloromethyl derivative of 2,4,6-substituted triazine having the following formula:

3. A chloromethyl derivative of 2,4,6-substituted triazine having the following formula:

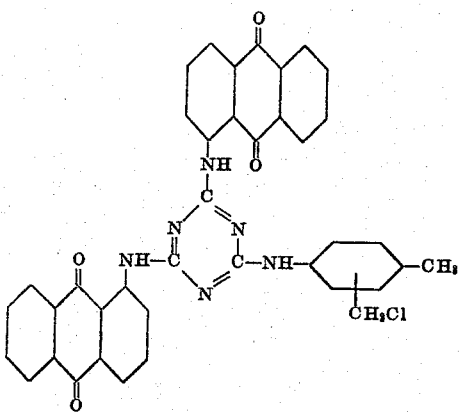

4. A chloromethyl derivative of 2,4,6-substituted triazine having the following formula:

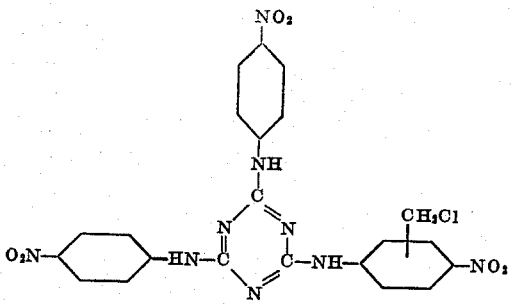

5. A chloromethyl derivative of 2,4,6-substituted triazine having the following formula:

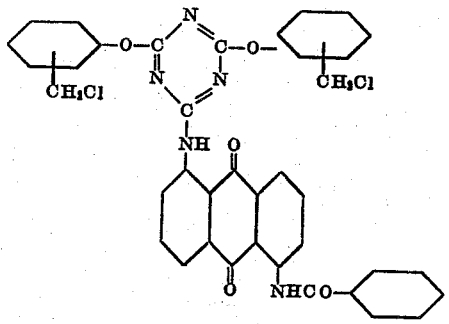

6. A chloromethyl derivative of 2,4,6-substituted triazine having the following formula:

References Cited in the file of this patent
UNITED STATES PATENTS

| | | |
|---|---|---|
| 2,312,698 | D'Alelio | Mar. 2, 1943 |
| 2,394,042 | D'Alelio | Feb. 5, 1946 |